Dec. 3, 1946.　　　M. A. MATHYS　　　2,411,930
RELIEF VALVE
Filed July 14, 1943　　　2 Sheets-Sheet 1
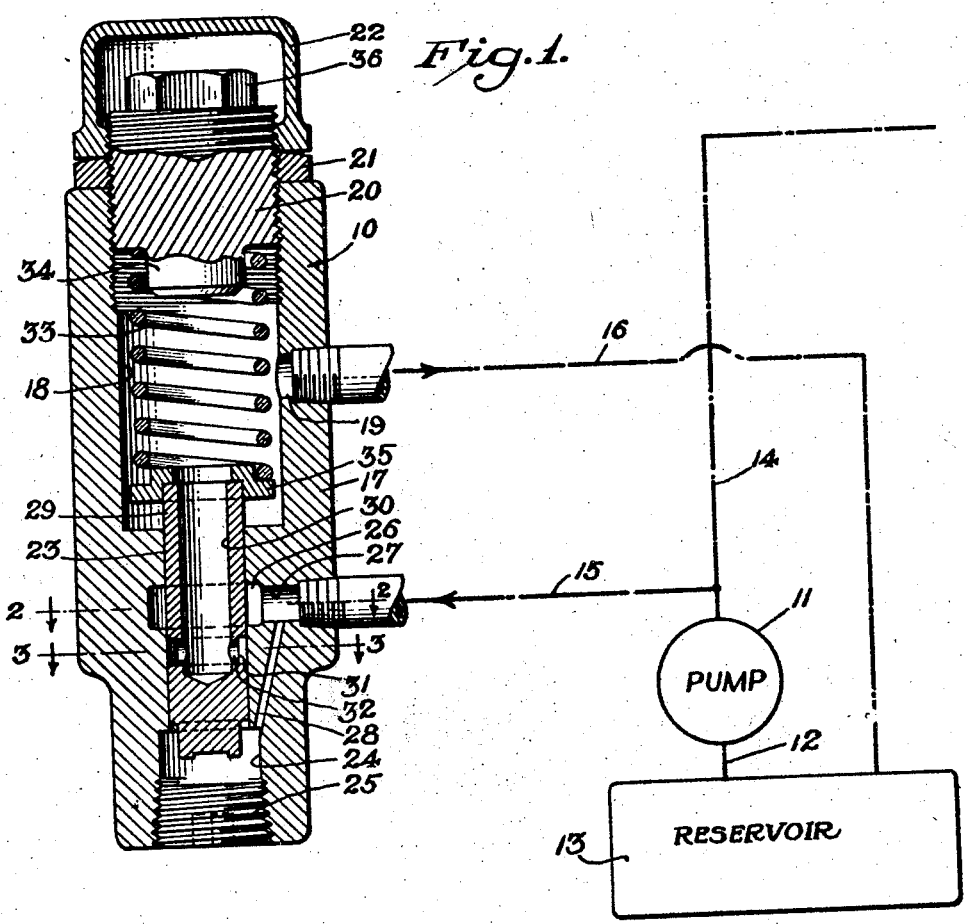
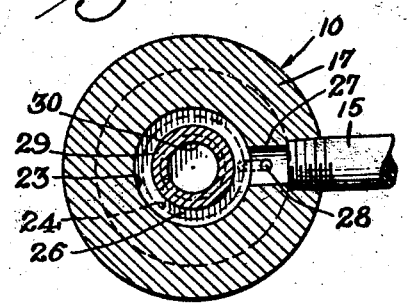
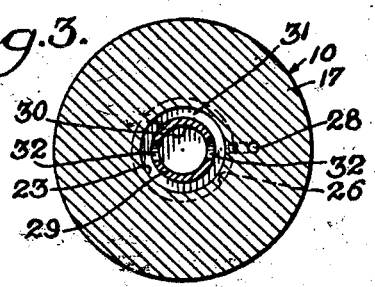
Inventor
Max A. Mathys
BY
Parker, Carlson, Pitzner + Hubbard
Attorneys

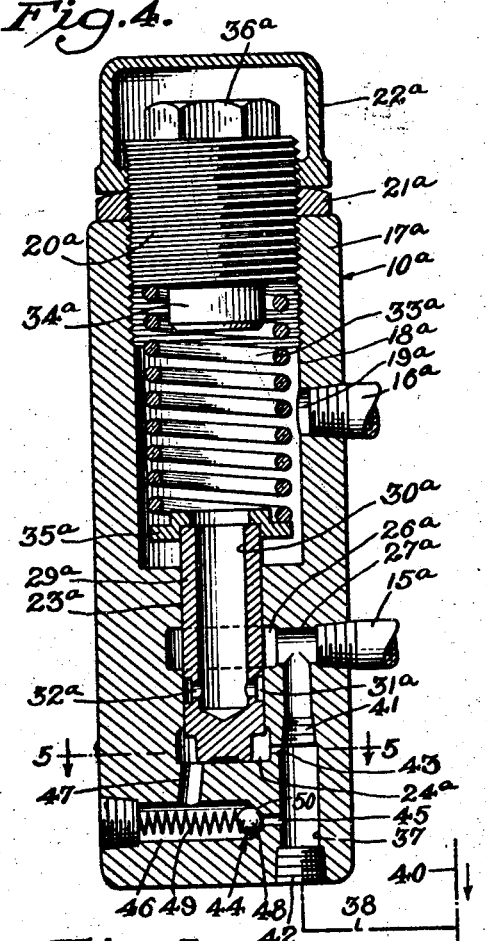

Patented Dec. 3, 1946

2,411,930

UNITED STATES PATENT OFFICE 2,411,930

RELIEF VALVE

Max A. Mathys, Detroit, Mich., assignor to Ex-Cell-O Corporation, Detroit, Mich., a corporation of Michigan Application July 14, 1943, Serial No. 494,609

5 Claims. (Cl. 137—53)

The present invention relates to improvements in relief valves for fluid pressure systems, and has particular reference to a new and improved valve adapted to divert fluid from a pressure line when the pressure therein tends to rise above a predetermined maximum.

One of the objects of the present invention is to provide a novel relief valve in which the closing pressure is more closely related to the opening pressure than in the case of conventional relief valves of the poppet type or piston type.

Another object is to provide a new and improved relief valve in which the closing pressure effective to terminate the fluid flow is substantially the same as the opening pressure effective to initiate the fluid flow, said pressures differing, if at all, only to the slightest possible extent.

Still another object is to provide a novel relief valve in which a dynamic force generated as an incident to a change in direction of fluid flow through the valve is utilized to supplement the closing pressure of a spring in opposition to the normal opening pressure of the fluid at the inlet acting on the valve member.

Other objects and advantages will become apparent as the description proceeds.

In the accompanying drawings,

Figure 1 is a fragmentary view of the hydraulic transmission system including a relief valve in longitudinal section and on an enlarged scale embodying the features of my invention.

Figs. 2 and 3 are transverse sectional views of the valve taken along lines 2—2 and 3—3 of Fig. 1.

Fig. 4 is a longitudinal sectional view of a relief valve constituting a modified form of the invention.

Fig. 5 is a transverse sectional view taken along line 5—5 of Fig. 4.

Fig. 6 is a fragmentary view partially in longitudinal section of a relief valve constituting another modified form of the invention.

Fig. 7 is a transverse sectional view taken along line 7—7 of Fig. 6.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the valve 10 shown in Figs. 1 to 3 constitutes one embodiment of the invention adapted primarily for use as a working pressure relief valve in a hydraulic transmission system. For purposes of illustration, the valve 10 is shown connected in a simple system having a pump 11 taking hydraulic fluid through an intake line 12 from a supply reservoir 13. The pump 11 has a discharge line 14 for conducting fluid under pressure to a point of use, such as a hydraulic actuator (not shown).

The valve 10 is connected in the system through an inlet pressure line 15 branching from the pump discharge line 14, and an outlet relief line 16 leading back to the reservoir 13, and in normal use is operable to bypass any excess fluid so as to limit the discharge pressure of the pump to a predetermined adjustable maximum working pressure.

In its exemplary form, the valve 10 comprises a main body 17 preferably cylindrical in shape. One end of the body 17 is formed with a relatively large bore 18 constituting a spring chamber and connected through an outlet passage 19 to the relief line 16. A screw plug 20 is adjustably threaded into the outer end of the bore 18 to close the latter, and is normally secured in position of adjustment by means of a lock nut 21 threaded thereon against the end of the body 17. Also threaded onto the outer end of the screw plug 20 to enclose the latter is a cap nut 22.

The opposite end of the valve body 17 is formed with a relatively small valve bore 23 opening coaxially to the bore 18. The outer end of the valve bore 23 is formed with a counterbore 24 closed by a screw plug 25 and constituting a pressure chamber. Formed in the inner peripheral surface of the valve bore 23 intermediate its ends is an annular groove 26 connected through an inlet passage 27 to the pressure line 15. A restricted snubber channel or passage 28 opens from the passage 27 to the chamber 24 to conduct fluid thereto at the valve inlet pressure.

A sleeve valve member 29 extends through the valve bore 23 with a snug sliding fit. The outer end of the valve member 29 is closed, and presents a valve opening pressure area exposed to the pressure in the chamber 24. The inner end portion of the member 29 is formed with an axial bore 30 opening to the chamber 18. The member 29 is also formed in the outer periphery with an annular groove 31 connected through a plurality of spaced radial ports 32 with the inner end of the bore 30, and adapted for movement into and out of communication with the groove 26. Thus, the grooves 26 and 31 constitute the valve ports, and are movable out of communication to close the valve 10, and into varying degrees of registration to open the valve. The path of flow through the valve 10 is from the inlet passage 27 through the ports 26 and 31, and radially through the ports 32 into the bore 30, and thence at right angles through the bore 30 and chamber 18 to the outlet passage 19.

The position of the valve member 29 is controlled by a coiled compression spring 33 acting thereon in a direction to close the valve 10 in opposition to a valve opening pressure exerted by the fluid at the inlet 27. The fluid pressure is transmitted from the inlet passage 27 through the snubber passage 28 to the chamber 24 wherein it acts against the end face area of the valve member 29. Thus, the valve opening area is of fixed size so that the opening pressure varies only as the pressure of the inlet fluid, and is not directly disposed in the path of fluid flow through the valve 10.

The spring 33 is disposed within the chamber 18, and seats at the outer end statically against the screw plug 20 about a centering pilot 34. The inner end of the spring 33 engages a spring pilot washer 35 fixed on the valve member 29. The valve closing pressure exerted by the spring 33 may be varied by adjusting the screw plug 20 which is provided with a hexagon head 36 to facilitate such adjustment.

In operation, when the fluid pressure in the inlet line 15 from the discharge line 14 of the pump 11 is below the normal working pressure, at which the valve 10 is set to open, the pressure of the fluid within the chamber 24 acting on the valve member 29 is insufficient to overcome the force of the spring 33, so that the ports 26 and 31 are completely out of registration to interrupt the bypass or relief of fluid. As the pressure in the chamber 24 rises, it acts against the valve member 29 to move the port 31 progressively toward and then into varying degrees of registration with the port 26 to open the valve. With the valve in open position, a portion of the fluid from the inlet line 15 is bypassed. The change in direction of flow of the fluid issuing from the radial ports 32 within the bore 30 of the valve member 29 generates a dynamic force which acts on the valve member 29 in a direction to supplement the force of the spring 33. Variation in the volume of flow through the valve will result in a corresponding variation in the dynamic force. Because of the control factors of the valve 10, the opening pressure and the closing pressure are approximately the same, and the desired maximum working pressure is effectively maintained within an extremely small range of variation.

Figs. 4 and 5 illustrate a modified form of relief valve which is convertible for use either as a pump pressure control, as in the case of the form of Figs. 1 to 3, or as an orifice pressure control. The construction is generally similar to that disclosed in Figs. 1 to 3, and corresponding parts are, therefore, identified by the same reference numerals, with the added subscript "a".

In the modified form of Figs. 4 and 5, the outer end of the valve bore 23ª does not open to the extreme end of the body 17, but terminates short thereof, and is diametrically enlarged to define the pressure chamber 24ª. Formed in the body 17 is a longitudinal bore 37 for connecting the pressure chamber 24ª optionally either to the inlet passage 27ª or to an outside line 38 leading from the upstream side of an adjustable pressure control orifice 39 in a line 40. The inner end portion of the bore 37 opens directly to the inlet passage 27ª, and is adapted to be closed by a screw plug 41. The outer end portion of the bore 37, which preferably is enlarged in diameter to facilitate insertion and removal of the plug 41, is likewise adapted to be closed by a screw plug 42, and is connected to the pressure chamber 24ª directly through a restricted port 43, and also through a passage including a check valve 44. In the present instance, the check valve 44 has an inlet passage 45 opening from the bore 37 to a transverse bore 46 in turn open to the chamber 24ª through a connecting bore 47, and a ball 48 normally urged by a light compression spring 49 within the bore 46 against a seat 50 at the end of the passage 45.

When the valve 10ª is to be adapted for pump pressure control to operate in substantially the same manner as the valve 10 of Figs. 1 to 3, the plug 41 is removed and the plug 42 is inserted. The inlet passage 27ª is then connected through the bore 37 and the port 43 to the pressure chamber 24ª. When the valve 10ª is to be adapted for orifice pressure control, the plug 41 is inserted and the plug 42 is removed, and the bore 37 is connected to the orifice control line 38. In this condition, the passage 27ª is blocked from the chamber 24ª so that the valve 10ª is not responsive to the inlet pressure from the pump discharge line 15ª. In both adaptations, pressure rises are freely transmitted through the check valve 44 to the pressure chamber 24ª, but in the event of a drop in the control pressure the resulting closing movement of the valve member 29ª is snubbed or dampened due to the restriction to fluid egress from the chamber through the port 43.

In orifice pressure control, the operation of the valve is responsive to the pressure established in the line 38 by the flow restriction through the orifice 39. Such orifice may be arranged in various types of control systems, for example to receive and meter fluid discharging from an actuator which in turn is motivated by fluid under pressure from the pump 11, as in the patent to Alden No. 2,000,553.

Figs. 6 and 7 disclose another modified form of the invention which is generally similar to that shown in Figs. 4 and 5 and, therefore, corresponding parts are identified by like reference numerals, with the addition of the subscript "b". In this case, a valve sleeve 51 is fixed in the valve bore 23ᵇ to receive the valve member 29ᵇ, and is formed with an annular groove 52 in communication with the inlet passage 27ᵇ. The sleeve 51 is formed with a plurality of peripheral ports 53 opening from the groove 52 to the inner bore for communication with the groove 31ᵇ in the valve member 29ᵇ.

The valve member 29ᵇ is so constructed that the downward dynamic flow reaction tending to urge the valve toward closed position will increase more rapidly than in the preceding forms upon an increase in the rate of flow so as to effect rapid closing. The ports 32ᵇ in the valve member 29ᵇ and the ports 53 in the sleeve 51 are radially inclined inwardly toward the closed end of the valve member, and the latter is formed intermediate the ports 32ᵇ with a curved central projection or baffle 54 extending longitudinally of the bore 30ᵇ. Whereas, in the first two forms, fluid passing through the valve is caused to change direction abruptly substantially at ninety degrees, the fluid in the last form will change direction at an acute angle, and the dynamic force of the fluid will have an increased longitudinal component tending to close the valve.

I claim as my invention:

1. A relief valve comprising, in combination, a valve body having a valve bore, a pressure inlet opening to the side of said bore and a relief outlet, a pressure responsive valve member reciprocable in said bore and having a port in the periphery movable into and out of communication with said inlet and a longitudinal bore closed at one end and establishing communication through the other end between said port and said outlet, said body being formed with a pressure chamber open to one end of said bore and a passage connecting said inlet to said chamber, said valve member having a pressure area at one end exposed to the pressure in said chamber, spring means acting on the other end of said valve member in a direction to close said valve in opposition to said pressure, said port opening to said longitudinal bore at an angle inclined radially inwardly toward the closed end of said longitudinal bore, and a baffle in the closed end of said longitudinal bore for directing the fluid issuing from said port through a sharp turn and then longitudinally out of said valve member to said outlet.

2. A relief valve comprising, in combination, an elongated body having a large bore in one end and a small valve bore opening coaxially to the inner end of said large bore and having an outlet passage opening from said large bore, the outer end of said valve bore defining a pressure chamber and said valve bore being formed intermediate its ends with an inlet port connected through a restricted flow passage to said chamber, a branch passage opening from said inlet port in parallel with said restricted passage to said chamber, a one-way check valve in said branch passage for admitting fluid to said chamber, a valve member movable in said valve bore with a sliding fit and formed with a longitudinal passage opening to said large bore and with a peripheral valve port opening to said longitudinal passage, one end of said valve member presenting a closed end surface exposed to the pressure in said chamber tending to move said valve member in a direction to bring said ports into communication, and a coiled compression spring in said large bore acting on said valve member in a direction opposite to said first mentioned direction, the kinetic energy created by the change of direction of flow through said valve member supplementing the pressure of said spring to act on said valve member in opposition to the pressure in said chamber.

3. A relief valve comprising, in combination, a body having a valve bore opening at one end to a pressure chamber and at the other end to a spring chamber and formed with inlet ports radially inclined upwardly and outwardly with respect to the pressure chamber end of said bore, a valve member reciprocable in said bore closed at the end adjacent said pressure chamber and formed with an axial bore opening to said spring chamber and with peripheral ports opening to said last mentioned bore and movable into and out of communication with said first mentioned ports and radially inclined in the same direction as said inlet ports, coiled compression spring means disposed in said spring chamber and acting on said valve member to urge said member in said one direction toward closed position, passage means for directing fluid from said inlet ports to said pressure chamber to act on the closed end of said valve member in opposition to the force of said spring means and the kinetic energy acting in the direction of the spring force generated by the fluid in said last mentioned bore, and a baffle at the inner end of said last mentioned bore for directing fluid from said last mentioned ports outwardly toward said spring chamber.

4. A relief valve comprising, in combination, a body having a valve bore opening at one end to a pressure chamber and at the other end to a spring chamber and formed with inlet ports radially inclined in one direction longitudinally of said bore, a valve member reciprocable in said bore and formed with an axial bore opening to said spring chamber and with peripheral ports opening to said last mentioned bore and movable into and out of communication with said inlet ports and radially inclined in said one direction, coiled compression spring means disposed in said spring chamber and acting on said valve member to urge said member in said one direction toward closed position, and passage means for directing fluid from said inlet ports to said pressure chamber to act on said valve member in opposition to the force of said spring means and the kinetic energy acting in the direction of the spring force generated by the fluid in the bore of said valve member.

5. A relief valve comprising, in combination, a body having a valve bore opening at one end to a pressure chamber and at the other end to a spring chamber and formed with a pressure inlet, a valve sleeve fixed in said bore and formed with inlet ports in communication with said inlet and radially inclined in one direction longitudinally of said bore, a valve member reciprocable in said sleeve and formed with an axial bore opening to said spring chamber and with valve ports opening to said last mentioned bore and adapted for communication with said inlet ports and radially inclined in said direction, coiled compression spring means disposed in said spring chamber and acting on said valve member to urge said member in said one direction, and a restricted passage for directing fluid from said inlet to said pressure chamber to act on said valve member in opposition to the force of said spring means.

MAX A. MATHYS.